(12) United States Patent
Barkan

(10) Patent No.: US 8,552,834 B2
(45) Date of Patent: Oct. 8, 2013

(54) ITEM FINDING USING RADIO FREQUENCY AND OPTICAL SIGNALING

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1070 days.

(21) Appl. No.: 11/807,932

(22) Filed: May 30, 2007

(65) Prior Publication Data

US 2008/0297323 A1 Dec. 4, 2008

(51) Int. Cl.
G08B 21/00 (2006.01)

(52) U.S. Cl.
USPC ..... 340/10.1; 340/10.3; 340/10.31; 340/10.5; 340/572.1; 705/22; 705/28; 705/29

(58) Field of Classification Search
USPC ........ 340/10.1, 10.3, 10.31, 10.5; 705/22, 28, 705/29
See application file for complete search history.

(56) References Cited

U.S. PATENT DOCUMENTS

| | | | | |
|---|---|---|---|---|
| 4,827,395 A * | 5/1989 | Anders et al. | ..................... | 700/9 |
| 6,335,685 B1 * | 1/2002 | Schrott et al. | .............. | 340/572.1 |
| 6,988,079 B1 * | 1/2006 | Or-Bach et al. | .................. | 705/28 |
| 2002/0063622 A1 * | 5/2002 | Armstrong et al. | ........ | 340/10.31 |
| 2004/0056779 A1 * | 3/2004 | Rast | .............................. | 340/985 |
| 2006/0001543 A1 * | 1/2006 | Raskar et al. | .............. | 340/572.1 |
| 2007/0268133 A1 * | 11/2007 | Sanchez et al. | ............ | 340/568.1 |
| 2007/0296581 A1 * | 12/2007 | Schnee et al. | .............. | 340/572.1 |

* cited by examiner

*Primary Examiner* — Mohammad Ghayour
*Assistant Examiner* — Mark Rushing
(74) *Attorney, Agent, or Firm* — Nong-Qiang Fan

(57) ABSTRACT

A system for, and method of, locating a particular item from among a plurality of items identifiable by radio frequency identification (RFID) tags associated with the items, includes an interrogator for radio frequency (RF) signaling the tags to detect unique identifiers associated with the tags in a field of view of the interrogator; and an optical signaler for optically signaling one of the tags in the field of view to designate the particular item to be located.

13 Claims, 2 Drawing Sheets

ITEM FINDING USING RADIO FREQUENCY AND OPTICAL SIGNALING

BACKGROUND OF THE INVENTION

1. Field of the Invention

The present invention generally relates to remotely identifying and locating items by using radio frequency signaling and, more particularly, to remotely identifying and locating a specific item from among many items by using both radio frequency signaling and optical signaling.

2. Description of the Related Art

Radio frequency identification (RFID) tags are now in common use with many goods or items. An RFID tag is an electronic device attached to an item or object and contains a unique identifier, e.g., an identification (ID) number, that can be interrogated and read remotely using a radio frequency (RF) signal. When the RFID tag is interrogated by an interrogator of an RFID tag reader, the tag responds with at least its unique identifier.

Many different types of RFID tags are now in use. For example, and not intended to be limiting: some tags are substantially passive, that is, they do not emit a signal but their presence in a field of an antenna of the reader dynamically alters the impedance of the antenna allowing their presence to be detected; some are semi-passive, that is, they receive a signal from the interrogator on a first frequency and use the received energy to reply on a second frequency; and some are active, that is, they have an on-board power source for the tag, which is turned on by a signal from the interrogator so that the tag can broadcast a response.

The tag identifier therefore identifies the item with which the tag is associated. When the tags are within a signaling range of the interrogator, they respond. If the unique identifier of the desired item is among those scanned by the interrogator, then a user will know that the desired item is present within the signaling range of the interrogator.

RFID tags are finding many useful applications in finding and identifying items, but there are some applications where bar code symbols on items provide a finding and identifying functionality that RFID tags cannot match. One such situation occurs when a specific item must be located in a warehouse full of items, or on a shelf stocked with many items in a retail establishment. In a warehouse picking application, a picker manually gathers various items from the shelves in a warehouse to fulfill specific orders. The picker is instructed to find a specific shelf location, and to pick a specified number of a particular item from the shelf. To minimize the chance of error, the picker is often required to scan a bar code symbol located on a label on the shelf, or on the item, to indicate to a computerized tracking system that the picker has indeed located the correct item. Unless the picker does this, the picker is not given the location of the next item to be picked, and so the picker cannot proceed without verifying that each item has been properly located.

Electro-optical readers for scanning and reading the bar code symbols used in these picking applications are often worn on the picker's finger, like a ring, or strapped to the back of the picker's hand, in order to enable the picker to manually grasp and pick up the items. The symbol readers have a working distance range of about a foot or more, thereby making it easier for the pickers to aim the readers at the symbols on items located on high or low shelves without excessive bending or reaching. Shelf labels on warehouse shelves are often packed closely together, but since a symbol reader can easily be aimed at a specific symbol, there is no doubt in the mind of the picker about which symbol has been scanned, and so the picker knows exactly which item should be picked.

Picking is sometimes done by personnel walking around the warehouse, and sometimes by operators riding in and operating forklifts, especially where the items that are being picked are very large, bulky or heavy. When an operator is on a forklift, the electro-optical symbol reader needs an even greater range of working distances, so that the operator does not have to get off the forklift to get close enough to the symbol to scan it with the reader.

RFID tags have been unable to replace bar code symbols in this kind of picking application because, unlike bar code symbol readers, it is not possible to aim the RFID reader at a specific tag and interrogate and read only the tag at which the RFID reader is aimed, and not also interrogate and read neighboring tags. If the RFID reader interrogates a neighboring tag, then a user will not know which RFID tag has been interrogated, and might pick the wrong item from the shelf.

One way to solve this problem with existing RFID technology is to reduce the interrogating range or sensitivity of the RFID reader to the point that it only has a few inches of range. This allows the RFID reader to read only a single RFID tag that might be within this limited interrogating range. However, if the RFID tags are very close together, then the interrogating range may have to be reduced to essentially zero to avoid possible mistakes. Unfortunately, when the interrogating range is reduced so much, it becomes very inconvenient for the user to interrogate tags on high and low shelves, or to otherwise locate a specific RFID tagged item that is not easily reached. It is even more inconvenient for those users on forklifts.

If this problem could be solved, RFID tags could be used to solve problems that only bar code symbols solve today. In fact, in the example given above, RFID technology could actually provide advantages over bar code reading technology, which could help justify the higher cost of RFID tags. For example, since RFID tags can be interrogated from a distance, even when out of a line of sight of the RFID reader, an RFID reader mounted on a forklift could start interrogating a desired tag as the forklift approaches, assuring the operator that he or she is heading towards the desired item. Of course, other neighboring tags would also be interrogated, but the operator would still know that he or she is in the right neighborhood to find the specific item being looked for. Once the operator arrives at the right place, however, the operator would still need to be able to interrogate only the desired tag, and ideally this would be accomplished without getting off the forklift. Hence, there is an advantage to have RFID readers that are capable of interrogating many tags at once, and are also capable of interrogating, or locating a specific tag.

SUMMARY OF THE INVENTION

One feature of the present invention resides, briefly stated, in a system for, and a method of, locating a particular item from among a plurality of items identifiable by radio frequency identification (RFID) tags associated with the items. The tags may be attached to the items, or attached to a shelf or pallet for supporting the items, or attached to a container in which the items are accommodated.

The system includes an interrogator for radio frequency (RF) signaling the tags to detect unique identifiers associated with the tags in a field of view of the interrogator; and an optical signaler for optically signaling one of the tags in the field of view to designate the particular item to be located. An antenna is coupled to the interrogator for transmitting an interrogation signal to, and for receiving response signals from, the tags; and a processor is operative for processing the response signals to detect the unique identifiers. The system includes a mobile housing in which the interrogator is supported for movement. The housing can be moved by a user, or supported on a vehicle, such as a forklift.

In one embodiment, the optical signaler includes an optical sensor, such as a photodiode, on each tag, and an optical designator, such as a laser source, supported by a user or a vehicle, for aiming and directing a laser light beam to the sensor on the one tag to designate the one tag. A modulator on the designator is operative for modulating the light beam to reduce the sensitivity of the photodiode to other light sources, such as ambient light, or to carry information to the tag so that the tag responds with different response signals. Only the one tag designated by the light beam generates a response signal to be processed by the processor.

In another embodiment, the optical signaler includes an indicator light, such as a light emitting diode, associated with each tag. The indicator light is illuminated in response to the interrogation signal to designate the one tag.

In either embodiment, the RF signaling gets the user close to the item to be located, and the optical signaling pinpoints the specific item.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
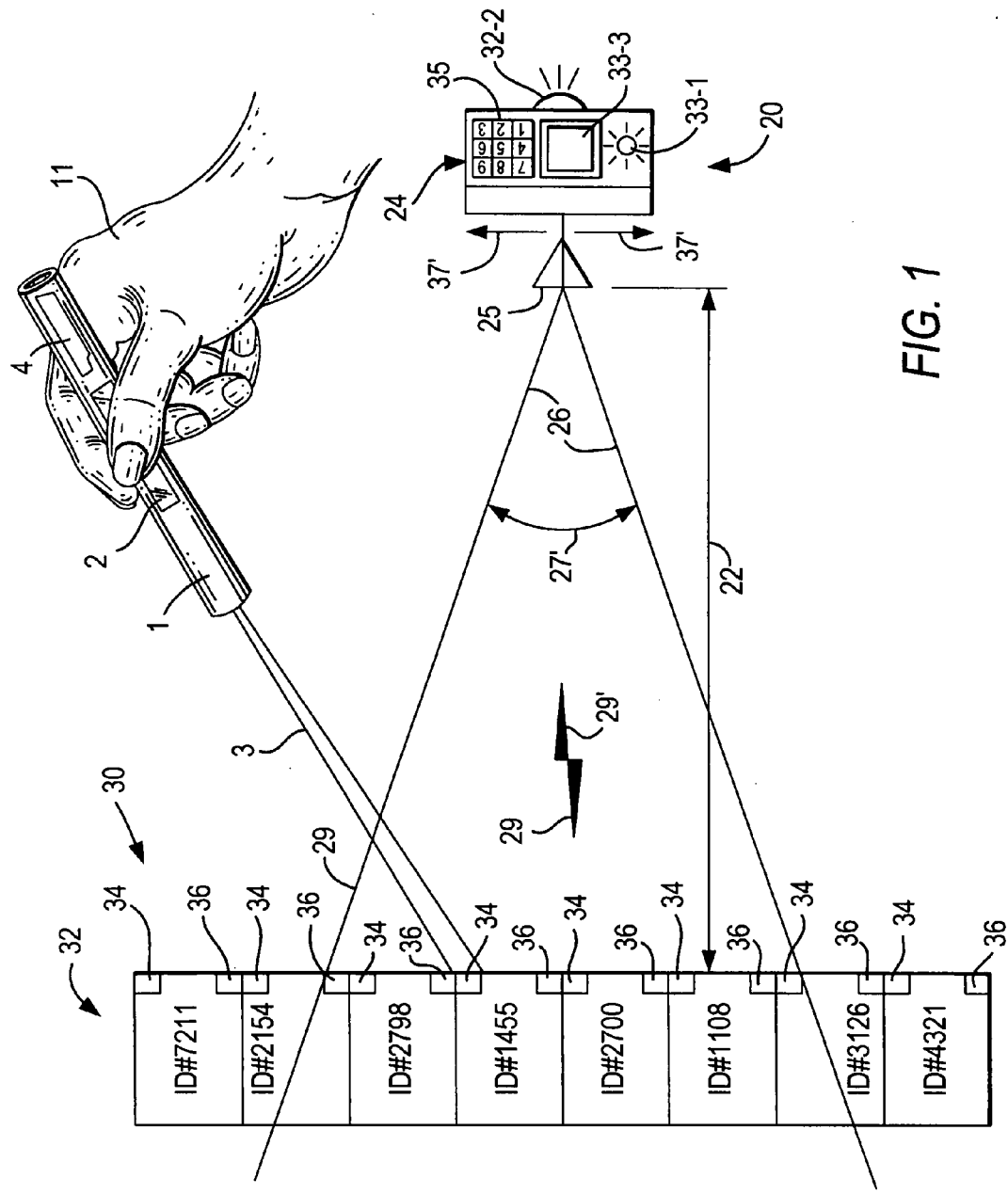
FIG. 1 is a plan or top simplified view of an item identification and locator system interacting with several RFID tagged objects or items in accordance with the present invention.

FIG. 1 is a simplified top plan view of an item identification and locator system 20 of the present invention, for interacting with a plurality of items 30 having associated therewith a corresponding plurality of RFID tags 32, each having a unique identifier. For convenience of description, it is assumed that the unique identifier is a number, that is, a unique series of digits (abbreviated as ID # or ID # XXXX). However, this is not intended to be limiting and persons of skill in the art will understand that the unique identifier can be any combination of alpha-numeric, binary, or other characters in any convenient representation system, of which decimal, hexi-decimal, binary, etc., are non-limiting examples.

System 20 comprises an RF reader or interrogator 24 with an associated antenna 25 and an annunciator that can include one or more of a visual indicator 33-1 and/or an audible indicator 33-2 and/or an alpha-numeric display 33-3 to alert a user when a desired item is detected. Interrogator 24 transmits, via the antenna 25, an RF interrogation signal 29 directed toward the plurality of items 30 and associated tags 32 and receives reception signals 29' in response. In this example, it is assumed merely for convenience of description that transmission signal 29 and reception signals 29' are both handled by the antenna 25, but this is not essential and not intended to be limiting. Separate transmit 25 and receive 25' antennas can also be used (e.g., see FIG. 2).

Interrogation signal 29 is localized and desirably has an approximately cone-shaped RF beam or interrogation pattern 26 bounded by an outer perimeter 28. The RF beam or pattern 26 has a vertical angle or extent and an azimuthal angle or extent 27'. A three-dimensional outer perimeter 28 of the RF beam or pattern 26 substantially defines the spatial volume within which the reader 24 can interrogate and detect the presence of the RFID tags and determine their unique identifiers.

Also, while the RF beam pattern 26 is illustrated herein as being approximately cone-shaped, this is merely for convenience of explanation and is not essential, and any spatially limited antenna pattern may be used. As used herein, the words "RF beam pattern" are intended to include an RF radiation/reception pattern of any shape, that is spatially limited in azimuth or elevation, or preferably both. Further, the beam pattern 26 is not limited merely to the transmitted signal 29 but can also apply to the received signals 29' or both, since it is generally a property of most antennas that their transmit and received signal beam patterns have about the same spatially limited shape, albeit of different size depending upon the interrogator's sensitivity.

For item-interrogator separations 22 that are within the sensitivity or interrogation range of the interrogator, it is desirable that the beam pattern 26 has an approximately constant angular aperture 27, 27' so that the number of items being exposed to the beam pattern 26 varies with the item-interrogator separation or interrogation range 22. Beyond the perimeter 28 of beam pattern 26, the transmit and/or receive signal strength drops off such that detection of an RF tag is unlikely. Thus, the perimeter 28 of beam pattern 26 can be thought of as defining the "field of view" of interrogator 24.

For example, in FIG. 1, the separation distance 22 is sufficiently large that the beam pattern 26 covers substantially most of the items 30 (and associated tags 32), e.g., items having ID #'s 2154, 2798, 1455, 2700, 1108, and 3126. Items 30 with ID #'s 7211 and 4321 are not covered. By scanning or moving the interrogator 24 back and forth, as shown by arrows 37, 37', while approaching a pile of items, the user can also search and find the items 30 with ID #'s 7211 and 4321.

Figure 2:
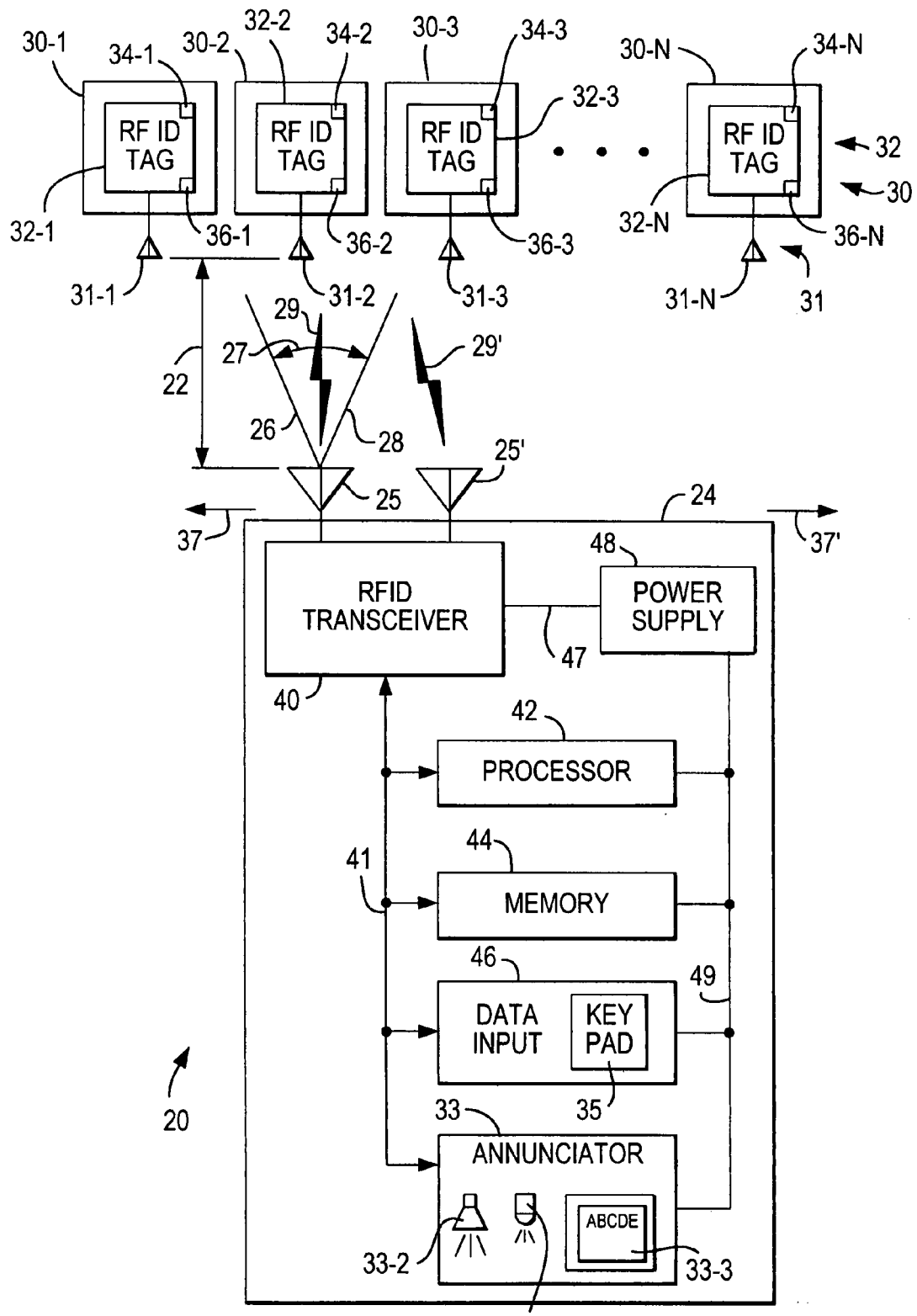
FIG. 2 is a simplified electrical block diagram of the item identification and locator system of FIG. 1.

FIG. 2 is a simplified electrical block diagram of the item identification and locator system 20 of FIG. 1 according to the present invention, for interacting with several RFID tags 32 associated with several items 30. In the example of FIG. 2, items 30 comprise a plurality of items 30-1, 30-2, 30-3 . . . 30-N with associated RFID tags 32-1, 32-2, 32-3 . . . 32-N. Antennas 31-1, 31-2, 31-3 . . . 31-N associated with the tags 32-1, 32-2, 32-3 . . . 32-N are also illustrated. Antenna 25 may handle both transmission of the RF interrogation signal 29 and reception of the tag response signals 29', or a separate receiving antenna 25' may be provided. Interrogator 24 may be provided with multiple antennas, where one or more serve different types of tags. Persons of skill in the art will understand which arrangement better suits their needs depending upon the types of tags 32 intended to be interrogated. Interrogator 24 is movable with respect to items 30 and tags 32 as indicated by arrows 37, 37'. Distance or range 22 to items 30 is also varied.

Interrogator 24 comprises an RFID transceiver 40, a controller or processor 42, a memory 44, a data input 46, an annunciator 33, and a power supply 48. Transceiver 40, processor 42, memory 44, data input 46 and the annunciator 33 are coupled and intercommunicate by a bus or leads 41. Power supply 48 is coupled to transceiver 40 by power leads 47 and to processor 42, memory 44, data input 46 and annunciator 33 by power leads 49. It is desirable that the power supply 48 be self-contained, as for example, using batteries, so that the interrogator 24 is freely portable, but this is not essential. Power supply 48 can be connected to external power mains by an extension cord (not shown), but this is less desirable since it limits the overall mobility of interrogator 24. In the preferred embodiment, interrogator 24 is powered by a rechargeable battery. However, other types of portable energy sources can be used, for example and not intended to be limiting, a fuel cell, a high-energy capacitor or a combination thereof. As used herein, the word "battery" is intended to include these and any other kind of portable power source of suitable voltage and current capacity.

The ID #'s of the items desired to be located may be input by the user via data input 46, as for example, via key pad 35, but this is not essential. Any means of advising the user of one or more ID #'s for item(s) desired to be located may be used. A non-limiting example of an alternate data input method is a touch pad and/or via a BLUETOOTH™-equipped portable data terminal. The entered ID #'s may be stored in the memory 44 or equivalent. It is preferable that memory 44 contain non-volatile memory (as well as transient memory) for this and other purposes.

Once the interrogator 24 is powered-up, the RFID transceiver 40, desirably but not essentially acting under the direction of processor 42, broadcasts the RF interrogation signal 29 toward items 30 and tags 32. Those of tags 32 that are within the RF beam pattern perimeter 28 (the overall interrogator "field of view") will respond with response signals 29'. It is desirable, but not essential, that transceiver 40 be capable of determining at least the relative strength of received signals 29'. Signal 29 can be a repetitive signal so that a series of response signals 29' is received by transceiver 40 from tags 32 within the field of view 28. The received signals are referred to in the art as "hits" and include the unique identifier (e.g., the ID #) of the interrogated tags. Depending upon the relative RF signal strength at different locations, the relative position of interrogator 24 and tags 32 and the presence of any intervening items, interrogator 24 may or may not receive a hit each time interrogation signal 29 is sent out by interrogator 24. However, it is generally the case that the frequency of hits increases as interrogator 24 is brought closer to tags 32.

Processor 42 receives the hits and when the ID #'s of the specific item(s) being sought are determined, processor 42 causes a visual or audible and/or other signal to be emitted by annunciator 33. For example, light 33-1 may illuminate or flash, speaker 33-2 may emit a beep or tone (continuous or intermittent or frequency varying) and/or alpha-numeric display 33-3 may display the located ID #'s or other alert message, or a vibrator (not shown) may alert the user, depending upon his or her needs. In the preferred embodiment, the signal (audible, visual and/or other) emitted by annunciator 33 is keyed to the hit rate and/or the signal strength of received RFID tag response signals 29'. Thus, the closer that interrogator 24 is to the object or item being looked for, the more rapid and/or the more intense the signals being emitted by annunciator 33. In this mode of operation, interrogator 24 functions in a manner analogous to a Geiger counter for detecting radiological material.

For example, when the item being sought is just barely within the field of view 28 of interrogator 24, annunciator 33 beeps or flashes (or both) very slowly. By sweeping or scanning interrogator 24 back and forth and/or up and down or both over the pile or array of items, the annunciator output may stop and start as the interrogator field of view excludes or includes the item(s) being sought. This tells the user the general direction of the item(s) being sought.

The user continues to sweep or scan interrogator 24 while moving toward the items. As the distance between the interrogator and the item(s) being sought decreases, the annunciator output rate desirably increases. When interrogator 24 is close enough so that a portion 21 of beam pattern 26 is directed generally at the object being sought, the output of annunciator 33 is, preferably, substantially continuous. While this is the preferred mode of operation, any form of annunciator operation that permits the user to determine when interrogator 24 is pointing generally directly at the item being sought and not others, is useful.

However, other items not being sought may also unavoidably be within the beam pattern 26 and are sending hits back to interrogator 24. They interfere with the locating function since the user is uncertain whether only the desired item has been found. This problem can be solved, as noted above, by reducing the size of the beam pattern to practically zero, but this requires the user to get very close to the item, and this may not be possible or practical.

In accordance with one feature of this invention, a user 11 is provided with a hand-held, or wearable, optical designator 1, such as a laser, operative, when a control switch 2 is actuated, for generating a visible laser or designating beam 3. When the user thinks he has located the desired item, the user aims the designator 1 at the RFID tag that is on the item, or on the shelf near the item. The RFID tags 32-1, 32-2, 32-3 . . . 32-N have respective optical receivers 34-1, 34-2, 34-3 . . . 34-N that can detect the presence of the designating light beam. The designating light beam can be modulated by a modulator 4 to make the designating light beam distinguishable from other light sources. The optical receiver on each tag can also include an optical filter to further reduce its sensitivity to ambient light. The modulation or wavelength of the designating light beam can also carry information. For example, the RFID tag can transmit different data depending on how the designating light beam is modulated.

Aside from the optical receiver, the tag will be conventional, except that it will be programmed to operate differently, depending on the presence or absence of the designating beam. If there is no designating beam, then the tag will react to an RF interrogation signal just like any other RFID tag, in which case it may be transmitting its encoded data along with other tags within the range of the interrogator. The interrogator may, however, transmit a signal that requests that only tags, that are presently seeing a designating beam, reply. Alternatively, all tags within the range can reply, but any tag that is detecting the designating beam will append a message to its reply that indicates that it is being optically designated. This allows the reader to determine which tag is being designated.

In practice, the RFID reader may be mounted on a forklift, and powered by the forklift's batteries. This will provide enough power to read tags from a distance. The forklift can also support a large antenna. The user can hold or wear the designator 1, which can be battery-powered for ease of use. The designator can include controls 2 that enable the user to send different signals to the RFID tag being designated. One signal, for example, might be to respond to the RFID interrogator with a specific acknowledgment, and another might be to remain silent while neighboring tags are being read.

In accordance with another feature of this invention, similar results can be obtained using RFID tags that include indicator lights 36-1, 36-2, 36-3 . . . 36-N, such as light emitting diodes (LEDs), mounted to be externally visible. The interrogator can broadcast a request for a response from a specific tag, and only that tag will light or blink its indicator lamp, allowing the operator to visually locate it from among a group of neighboring tags.

The first kind of tag, which is designated by a laser beam 3 or the like, has the advantage that it can be powered entirely by the RF energy from the RFID interrogator 24. The second kind, which includes an LED or other visual indicator 36, might need an internal battery to supply enough power to light the LED. Some display technologies, on the other hand, such as liquid crystal displays or E-Ink™, use so little power that they might also be powered by the RF energy, eliminating the need for a battery in the tag.

It will be understood that each of the elements described above, or two or more together, also may find a useful application in other types of constructions differing from the types described above.

While the invention has been illustrated and described as embodied in item finding using RF signaling or optical signaling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A system for locating a particular item from among a plurality of items identifiable by radio frequency identification (RFID) tags associated with the items, comprising:
    an interrogator for radio frequency (RF) signaling the tags to detect unique identifiers associated with the tags in a field of view of the interrogator; and
    an optical signaler for optically signaling one of the tags in the field of view to designate the particular item to be located,
    wherein the optical signaler includes an optical sensor on each tag, and an optical designator supported by a user for aiming and directing a light beam to the optical sensor on the one tag to designate the one tag,
    wherein the optical designator is a laser source for emitting the light beam as a laser beam to the optical sensor on the one tag, and wherein the optical sensor is a laser light detector for detecting the laser beam incident on the one tag,
    wherein the laser beam has a significantly narrow beam width enabling the selection of only one RFID tag at a time as selected RFID tag;
    wherein more than one RFID tag responds to the RF signal from the interrogator with a reply to be received by the interrogator, but an optical-activated RFID tag that is detecting the laser beam includes a message in its reply that includes both an unique identification of the optical-activated RFID tag and information indicating that the optical-activated RFID tag is being optically designated.

2. The system of claim 1, further comprising an antenna coupled to the interrogator for transmitting an interrogation signal to, and for receiving response signals from, the tags; and a processor for processing the response signals to detect the unique identifiers.

3. The system of claim 2, further comprising a mobile housing in which the interrogator is supported for movement.

4. The system of claim 3, further comprising a battery supported by the housing for supplying electrical power to the interrogator.

5. The system of claim 1 further comprising a modulator for modulating the light beam.

6. The system of claim 1, wherein the optical signaler includes an indicator light associated with each tag, and wherein the indicator light is illuminated in response to the interrogation signal to designate the one tag.

7. A system for locating a particular item from among a plurality of items identifiable by radio frequency identification (RFID) tags associated with the items, comprising:
    means for radio frequency (RF) signaling the tags to detect unique identifiers associated with the tags in a field of view; and
    means for optically signaling one of the tags in the field of view to designate the particular item to be located,
    wherein the optical signaling means includes an optical sensor on each tag, a means for aiming and directing a laser beam to the optical sensor on the one tag to designate the one tag, and a means for detecting the laser beam incident on the one tag,
    wherein the laser beam has a significantly narrow beam width enabling the selection of only one RFID tag at a time as selected RFID tag;
    wherein more than one RFID tag responds to a RF signal from the means for RF signaling with a reply to be received by the interrogator, but an optical-activated RFID tag that is detecting the laser beam includes a message in its reply that includes both an unique identification of the optical-activated RFID tag and information indicating that the optical-activated RFID tag is being optically designated.

8. A method of locating a particular item from among a plurality of items identifiable by associating radio frequency identification (RFID) tags with the items, comprising the steps of:
    radio frequency (RF) signaling the tags, by an interrogator, to detect unique identifiers associated with the tags in a field of view; and
    optically signaling one of the tags in the field of view to designate the particular item to be located,
    wherein optically signaling one of the tags includes mounting an optical sensor on each tag, aiming and directing a laser beam to the optical sensor on the one tag to designate the one tag, and detecting the laser beam incident on the one tag,
    wherein the laser beam has a significantly narrow beam width enabling the selection of only one RFID tag at a time as selected RFID tag;
    wherein more than one RFID tag responds to the RF signal from the interrogator with a reply to be received by the interrogator, but an optical-activated RFID tag that is detecting the laser beam includes a message in its reply that includes both an unique identification of the optical-activated RFID tag and information indicating that the optical-activated RFID tag is being optically designated.

9. The method of claim 8, further comprising the steps of transmitting an interrogation signal to, and receiving response signals from, the tags; and the step of processing the response signals to detect the unique identifiers.

10. The method of claim 9, further comprising the step of moving a mobile housing in which the RF signaling step is performed.

11. The method of claim 10, further comprising the step of supplying electrical power within the housing in which the RF signaling step is performed.

12. The method of claim 9, wherein the step of optically signaling includes associating an indicator light with each tag, and the step of illuminating the indicator light in response to the interrogation signal to designate the one tag.

13. The method of claim 8, further comprising the step of modulating the laser beam.

* * * * *